US012643071B2

(12) United States Patent　　　　(10) Patent No.:　US 12,643,071 B2
Goertz et al.　　　　　　　　　　　(45) Date of Patent:　　　Jun. 2, 2026

(54) SYSTEM AND METHOD FOR RECLAIMING SOLVENT

(71) Applicants:Donaldson Company, Inc., Bloomington, MN (US); Ecosce LLC, Oakland, CA (US)

(72) Inventors: Matthew P. Goertz, Bloomington, MN (US); Matthew S. Whitten, St. Paul, MN (US); Ahmed Shuja, Oakland, CA (US); Shawn McLean, Sturbridge, MA (US)

(73) Assignees: Donaldson Company, Inc., Bloomington, MN (US); Ecosce LLC, Oakland, CA (US)

( * ) Notice: Subject to any disclaimer, the term of this patent is extended or adjusted under 35 U.S.C. 154(b) by 274 days.

(21) Appl. No.: 18/128,402

(22) Filed: Mar. 30, 2023

(65) Prior Publication Data

US 2023/0347291 A1　　　Nov. 2, 2023

Related U.S. Application Data

(60) Provisional application No. 63/325,463, filed on Mar. 30, 2022.

(51) Int. Cl.
　　*B01D 61/36*　　　(2006.01)
　　*B01D 43/00*　　　(2006.01)
　　　　　　(Continued)

(52) U.S. Cl.
　　CPC ........... *B01D 61/362* (2013.01); *B01D 43/00* (2013.01); *B01D 61/027* (2013.01)

(58) Field of Classification Search
　　CPC .... B01D 61/362; B01D 43/00; B01D 61/027; B01D 9/0054; B01D 2311/06;
　　　　　　　(Continued)

(56) References Cited

U.S. PATENT DOCUMENTS 3,870,746　A　　3/1975　Lussling et al.
4,952,751　A　　8/1990　Blume et al.
　　　　　　　(Continued)

FOREIGN PATENT DOCUMENTS

AU　　　2019264627　A1　　12/2019
AU　　　2017345399　B2　　　2/2022
　　　　　　　(Continued)

OTHER PUBLICATIONS

Farid A. Harraz et al., Applied Surface Science vol. 307, Jul. 15, 2014, pp. 704-711. (Year: 2014).*
　　　　　　　(Continued)

*Primary Examiner* — Pranav N Patel
(74) *Attorney, Agent, or Firm* — Mueting Raasch Group

(57)　　　　　　ABSTRACT

A system for separating a solvent includes a first mixing tank comprising a waste solvent feed and a reactant feed; a first filter comprising a nanofiltration membrane; a distillation column or an evaporator; a condenser or cooler; and a pervaporation membrane. A method for separating a solvent includes mixing a waste solvent with a reactant to cause precipitation or complexing and forming a mixture; filtering the mixture using a nanofiltration membrane and forming a permeate; distilling or evaporating the permeate to form a concentrated solvent; condensing or cooling the concentrated solvent to below a boiling point of solvents in the concentrated solvent; and filtering the concentrated solvent using pervaporation to form a purified solvent. The system and method may be used to separate and purify a solvent without creating thermal degradation products.

19 Claims, 5 Drawing Sheets

(51) Int. Cl.
  B01D 61/02       (2006.01)
  C02F 1/04        (2023.01)
  C02F 1/44        (2023.01)

(58) Field of Classification Search
  CPC .... B01D 2311/2669; B01D 2311/2697; B01D
         3/145; B01D 61/145; B01D 61/147;
         B01D 61/36; B01D 61/58; B01D 3/10;
         C02F 1/04; C02F 1/448; C02F 9/00;
         C02F 1/442; C02F 1/444
  See application file for complete search history.

(56)                References Cited

U.S. PATENT DOCUMENTS

| | | | |
|---|---|---|---|
| 5,069,686 | A | 12/1991 | Baker et al. |
| 5,256,295 | A | 10/1993 | Baker et al. |
| 5,670,051 | A | 9/1997 | Pinnau et al. |
| 5,707,423 | A | 1/1998 | Pinnau et al. |
| 5,711,882 | A | 1/1998 | Hofmann et al. |
| 5,769,926 | A | 6/1998 | Lokhandwala et al. |
| 5,769,927 | A | 6/1998 | Gottschlich et al. |
| 5,868,906 | A * | 2/1999 | Adams ................... B01D 3/146 |
| | | | 203/DIG. 16 |
| 5,964,923 | A | 10/1999 | Lokhandwala |
| 6,011,192 | A | 1/2000 | Baker et al. |
| 6,159,272 | A | 12/2000 | Baker et al. |
| 6,179,996 | B1 | 1/2001 | Baker et al. |
| 6,190,540 | B1 | 2/2001 | Lokhandwala et al. |
| 6,316,684 | B1 | 11/2001 | Pinnau et al. |
| 6,365,051 | B1 | 4/2002 | Bader |
| 6,508,917 | B1 | 1/2003 | Miles et al. |
| 6,565,626 | B1 | 5/2003 | Baker et al. |
| 6,572,678 | B1 | 6/2003 | Wijmans et al. |
| 6,592,650 | B2 | 7/2003 | Pinnau et al. |
| 6,755,975 | B2 | 6/2004 | Vane et al. |
| 6,896,717 | B2 | 5/2005 | Pinnau et al. |
| 6,899,743 | B2 | 5/2005 | Wijmans et al. |
| 7,132,008 | B2 | 11/2006 | Wijmans et al. |
| 7,135,870 | B2 | 11/2006 | Mohajer et al. |
| 7,313,926 | B2 | 1/2008 | Gurin |
| 7,459,084 | B2 | 12/2008 | Baig et al. |
| 7,739,891 | B2 | 6/2010 | Luckman et al. |
| 8,056,322 | B2 | 11/2011 | Winkler et al. |
| 8,263,815 | B2 | 9/2012 | Huang et al. |
| 8,506,812 | B2 | 8/2013 | Wan et al. |
| 8,702,910 | B2 | 4/2014 | Duraiswamy et al. |
| 9,138,678 | B2 | 9/2015 | Huang et al. |
| 10,174,260 | B2 | 1/2019 | Iversen |
| 10,245,551 | B2 | 4/2019 | Baker et al. |
| 10,252,221 | B2 | 4/2019 | Berzinis et al. |
| 10,336,690 | B2 | 7/2019 | Gajda et al. |
| 10,577,269 | B1 | 3/2020 | Bader |
| 10,738,254 | B2 | 8/2020 | Lokhandwala et al. |
| 10,870,084 | B2 | 12/2020 | Hidaka et al. |
| 11,020,685 | B2 | 6/2021 | Hidaka et al. |
| 11,090,609 | B2 | 8/2021 | Kang et al. |
| 11,111,209 | B2 | 9/2021 | Michael et al. |
| 11,406,916 | B2 | 8/2022 | Parmentier |
| 11,925,901 | B2 | 3/2024 | Goertz et al. |
| 2005/0155393 | A1 | 7/2005 | Wright et al. |
| 2005/0217479 | A1 | 10/2005 | Hale et al. |
| 2007/0151447 | A1 | 7/2007 | Merkel |
| 2008/0073201 | A1 | 3/2008 | Van Gysel et al. |
| 2008/0210540 | A1* | 9/2008 | Dieterle ................... B01D 3/14 |
| | | | 203/19 |
| 2009/0053800 | A1 | 2/2009 | Friend et al. |
| 2012/0073954 | A1 | 3/2012 | Cesas |
| 2013/0126432 | A1* | 5/2013 | Kreiter .............. B01D 67/0079 |
| | | | 210/259 |

| | | | |
|---|---|---|---|
| 2015/0224449 | A1 | 8/2015 | Kuo |
| 2016/0002073 | A1 | 1/2016 | Nowosielski-Slepowron |
| 2017/0043297 | A1 | 2/2017 | Berzinis et al. |
| 2018/0030555 | A1 | 2/2018 | Van Tuel et al. |
| 2018/0057754 | A1* | 3/2018 | Iversen ................. C10G 1/047 |
| 2019/0048301 | A1 | 2/2019 | Maroy |
| 2019/0177292 | A1 | 6/2019 | Marckmann et al. |
| 2020/0306666 | A1* | 10/2020 | Parmentier ........... G01N 30/34 |
| 2021/0198136 | A1 | 7/2021 | Jani |
| 2022/0134284 | A1 | 5/2022 | Baker et al. |
| 2022/0176321 | A1 | 6/2022 | Mitra et al. |
| 2023/0055876 | A1 | 2/2023 | Van Hecke et al. |
| 2023/0390703 | A1 | 12/2023 | Goertz et al. |

FOREIGN PATENT DOCUMENTS

| | | | |
|---|---|---|---|
| CA | | 2187933 A1 | 11/1995 |
| CA | | 2 674 465 A1 | 7/2008 |
| CA | | 2 679 444 A1 | 10/2008 |
| CN | | 106631890 B | 8/2019 |
| CN | | 112174852 A | 1/2021 |
| EP | | 0 348 501 B1 | 1/1994 |
| EP | | 0 548 281 B1 | 8/1995 |
| EP | | 0 725 670 A1 | 8/1996 |
| EP | | 0 502 877 B1 | 5/2001 |
| EP | | 1 762 295 A1 | 3/2007 |
| EP | | 2 080 076 A2 | 7/2009 |
| EP | | 2 109 372 A2 | 10/2009 |
| EP | | 2 179 085 B1 | 5/2014 |
| EP | | 2 995 365 A1 | 3/2016 |
| EP | | 2 195 106 B1 | 8/2019 |
| EP | | 3 429 717 B1 | 5/2020 |
| WO | | WO 95/11737 A1 | 5/1995 |
| WO | | WO 2003/068688 A1 | 8/2003 |
| WO | | WO 2005/059234 A2 | 6/2005 |
| WO | | WO 2008/039725 A2 | 4/2008 |
| WO | | WO 2008/099325 A2 | 8/2008 |
| WO | | WO 2016/040500 A1 | 3/2016 |
| WO | | WO 2018035382 A1 | 2/2018 |

OTHER PUBLICATIONS

Ecosce Inc brochure, "Omega MK1", 2 pages. No date available, believed to be available as early as 2020. Obtained from the internet Aug. 8, 2023. Available online at www.ecosce.com/wp-content/uploads/2020/12/Ecosce_Brochure.pdf.

Fontalvo, et al., "Comparing Pervaporation and Vapor Permeation Hybrid Distillation Processes", 2005, *Ind. Eng. Chem. Res.*, 44:5259-5266.

Le Phuong, et al., "Reporting the unreported: the reliability and comparability of the literature on organic solvent nanofiltration", 2020, *Green Chemistry*, 22:3397-3409.

International Patent Application No. PCT/US2023/016805 filed Mar. 30, 2023, PCT International Search Report and Written Opinion mailed Jul. 19, 2023, 9 pages.

Sholl, et al., "Seven chemical separations to change the world", Apr. 28, 2016, *Nature*, 532(7600):435-437, plus correction sheet.

Shuja, et al., "Technical Article: Membranes Promote Efficiency in Polypeptide Production", Mar. 2022, Donaldson Filtration Solutions, Donaldson Company, Inc., Minneapolis, MN, 2 pages.

Siew, et al., "Downstream processing of recombinant human insulin and its analogues production from *E. coli* inclusion bodies", 2021, *Bioresources and Bioprocessing*, 8:65.

Zhang, et al., "Use of capacitive microsensors and ultrasonic time-domain reflectometry for in-situ quantification of concentration polarization and membrane fouling in pressure-driven membrane filtration", Oct. 12, 2006, *Sensors and Actuators B: Chemical*, 117(2):323-331. Available online Dec. 15, 2005.

* cited by examiner

SYSTEM AND METHOD FOR RECLAIMING SOLVENT

RELATED APPLICATIONS

This application claims the benefit of U.S. Provisional Application No. 63/325,463, filed 30 Mar. 2022, the disclosure of which is incorporated by reference herein in its entirety.

FIELD

The present disclosure relates to solvent recovery. The present disclosure further relates to filtration systems and methods for recovering solvents, such as those used in chromatography.

BACKGROUND

It is common for a pharmaceutical manufacturing company to spend large quantities of time and energy separating components of chemical mixtures into pure or purer forms. A groundbreaking study in 2016 (Sholl, D., and Lively, R., *Seven chemical separations to change the world*, 532 Nature 7600, 2016) estimated that purification processes, such as distillation, account for 10-15% of the US energy consumption. Primarily this is due to manipulating chemicals by evaporation and subsequently cooling.

The pharmaceutical industry commonly uses chromatographic separation methods to purify drugs, which requires large amounts of solvents. Storage and disposal of the used solvents can be hazardous and costly. To re-use the solvents, they would need to be purified to 99% purity or higher, as required by the US FDA.

There is a need in the art for sustainable separation methods to separate and reclaim solvents used in chemical processes and separations.

SUMMARY

Systems and methods for recovering solvents, such as those used in chromatography are provided.

A system for separating a solvent includes a first mixing tank comprising a waste solvent feed and a reactant feed; a first filter comprising a nanofiltration membrane configured to receive flow from the first mixing tank; a distillation column or an evaporator, configured to receive permeate from the first filter; a condenser or cooler configured to condense or cool flow from the distillation column or evaporator; and a pervaporation membrane configured to receive condensed or cooled flow from the condenser or cooler. The waste solvent feed may include a feed stream from a chromatographic separation system.

A method for separating a solvent includes mixing a waste solvent with a reactant to cause precipitation or complexing and forming a mixture; filtering the mixture using a nanofiltration membrane and forming a permeate; distilling or evaporating the permeate to form a concentrated solvent; condensing or cooling the concentrated solvent to below a boiling point of solvents in the concentrated solvent; and filtering the concentrated solvent using pervaporation to form a purified solvent. The waste solvent may include a first solvent and a second solvent and at least one contaminant. The reactant reacts with or complexes with the at least one contaminant. The waste solvent may include a chromatographic separation waste steam. The reactant may include a buffer. The reactant may include a base, wherein the reactant optionally may include sodium bicarbonate, magnesium chloride, ferric chloride, sodium hydroxide, trisaminomethane, polyethyleneimine, triethylamine, or a combination of any two or more thereof. The first solvent may include acetonitrile, ethanol, methanol, isopropanol, butanol, ethyl acetate, acetone, chloroform, diethyl ether, halothane, benzene, hexafluorobenzene, or a combination of any two or more thereof. The second solvent may include water or an organic solvent different from the first solvent. The purified solvent may include less than 500 ppm of thermal degradation products, optionally wherein the thermal degradation products comprise nitrosamines.

DEFINITIONS

Figure 1:
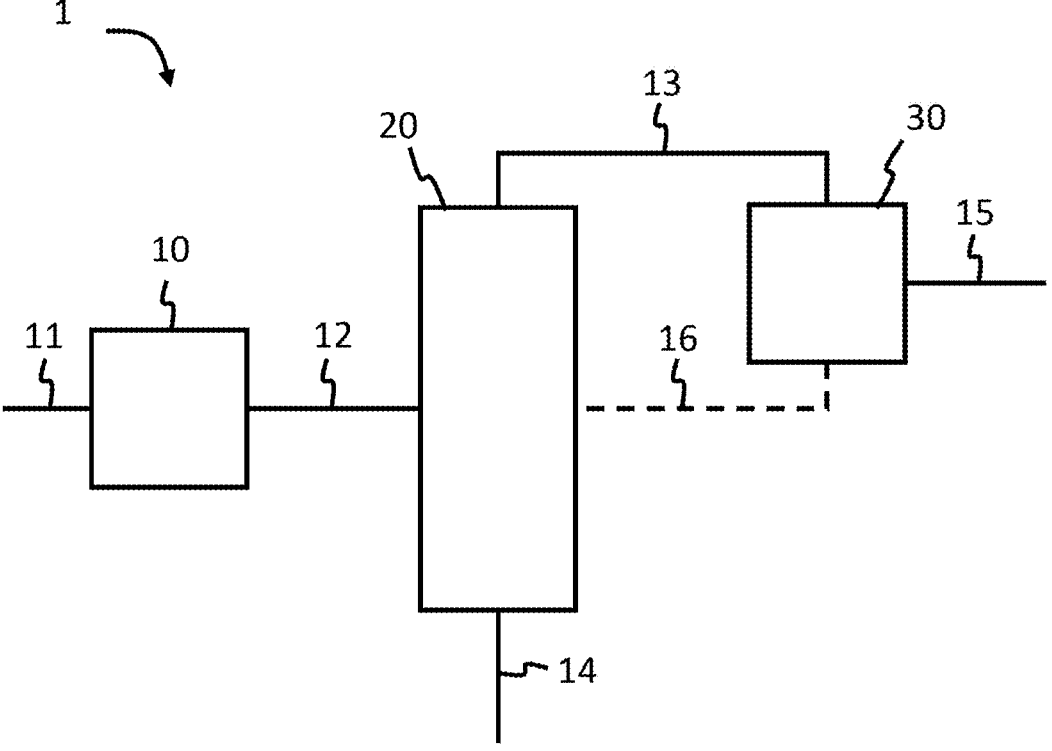
FIG. 1 is a schematic system diagram of a solvent recovery system according to an embodiment.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "substantially" as used here has the same meaning as "significantly," and can be understood to modify the term that follows by at least about 90%, at least about 95%, or at least about 98%. The term "substantially free" of a particular compound means that the compositions of the present invention contain less than 1,000 parts per million (ppm) of the recited compound.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood to have the same meaning as "approximately" and to cover a typical margin of error, such as +5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of"

and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have," "having," "include," "including," "comprise," "comprising," or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method, or the like, means that the components of the composition, product, method, or the like are limited to the enumerated components and any other components that do not materially affect the basic and novel characteristic(s) of the composition, product, method, or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to solvent recovery. The present disclosure relates to filtration systems and methods for recovering solvents. The present disclosure further relates to filtration systems and methods for recovering solvents used in chromatography.

The present disclosure provides systems and methods to reclaim solvents used during industrial scale chromatography. According to embodiments, the systems and methods may be used to reclaim (e.g., separate and purify) solvents used in chromatography to purify pharmaceutical components. According to an embodiment, the systems and methods may be used to reclaim (e.g., separate and purify) solvents used in chromatography to purify polypeptide solutions. An example of a polypeptide solution is a solution left over after production and purification of insulin. According to an embodiment, the methods of the present disclosure utilize pervaporation. Pervaporation may be used to break an azeotrope.

The methods may also include additional steps that facilitate or improve the efficiency of the pervaporation. For example, the methods may include various precipitation, filtration, and/or distillation steps to remove contaminants and diluting solvents (e.g., water or another solvent).

Some organic solvents cannot be separated and purified simply by using distillation due to the formation of an azeotrope. Examples of organic solvents that form an azeotrope with water include acetonitrile and ethanol. In the case of acetonitrile, the azeotrope occurs at about 85% acetonitrile, 15% water. In order to reclaim and reuse acetonitrile (e.g., after being used in chromatographic separation), it would be desirable for the concentration of acetonitrile to be 99% or higher. It would be beneficial to provide systems and methods that can be used to separate and purify solvents, regardless of their tendency to form azeotropes. It would be desirable to provide systems and methods that do not cause the formation of thermal degradation products, such as nitrosamines, or other additional contaminants in the liquid stream. It would be desirable to provide systems and methods that can be used to separate and purify solvents with lower energy usage than conventional processes, such as pressure swing distillation.

The term "waste solvent" is used here to refer to a mixture that is a waste product or byproduct of another process (e.g., an industrial process, such as an industrial separation process) and that includes at least a first solvent (a solvent or interest) and a second solvent. The waste solvent may also include various other solvents and non-solvent impurities. According to an embodiment, the systems and methods of the present disclosure may be used to process waste solvent that contains two or more solvents, separate at least one of the solvents (the solvent of interest), and to concentrate the separated solvent. One of the solvents within the waste solvent may be an organic solvent. One of the solvents within the waste solvent may be water or another organic solvent. The solvent being separated and concentrated may be an organic solvent, e.g., the first organic solvent. The solvent being separated and concentrated may be the only organic solvent in the waste solvent. The concentration of the solvent of interest (e.g., the organic solvent) in the waste solvent prior to separation is not particularly limited. In some exemplary embodiments, the concentration of the solvent of interest in the waste solvent is 5 vol-% or greater, 10 vol-% or greater, 15 vol-% or greater, 20 vol-% or greater, 30 vol-% or greater, 40 vol-% or greater, 50 vol-% or greater, or 75 vol-% or greater. The concentration of the solvent of interest in the waste solvent may be 99.5 vol-% or less, 99 vol-% or less, 98 vol-% or less, 95 vol-% or less, 90 vol-% or less, 80 vol-% or less, 70 vol-% or less, 60 vol-% or less, or 50 vol-% or less. The waste solvent may also include a second solvent (e.g., water or another organic solvent). The concentration of the second solvent in the waste solvent is not particularly limited. The second solvent (e.g., water or another organic solvent) may be included in the waste solvent, for example, at a concentration of 0.5 vol-% to 95 vol-%, of 40 vol-% to 90 vol-%. According to an embodiment, the solvent of interest (e.g., the organic solvent) is separated from a second solvent (e.g., water or another organic solvent) and is concentrated to a concentration of 90 vol-% or greater, 95 vol-% or greater, 96 vol-% or greater, 97 vol-% or greater, 98 vol-% or greater, 99 vol-% or greater, 99.5 vol-% or greater, 99.8 vol-% or greater, or 99.9 vol-% or greater. The solvent of interest (e.g., the organic solvent) may be separated from a second solvent (e.g., water or another organic solvent) and is concentrated to a concentration that is above the azeotropic concentration of the solvent of interest in a mixture of solvent of interest and the second solvent. In one exemplary embodiment, the solvent of interest (e.g., the organic solvent) is present in the waste solvent at a concentration of 20 vol-% to 60 vol-% (e.g., about 30 vol-%) and is separated from a second solvent (e.g., water or another organic solvent) and concentrated to a concentration of 99 vol-% or greater using the system and method of the present disclosure.

The concentration of non-solvent contaminants in the waste solvent may vary widely. The contaminants may be dissolved or suspended in the waste solvent. The contaminants may include inorganic compounds, organic compounds, biological compounds, and the like. If the waste solvent includes large amounts of contaminants (e.g., 10 wt-% or more, or 5 wt-% or more), the waste solvent may be first processed to remove a majority of the contaminants prior to separating and purifying the solvent of interest. In some embodiments, the waste solvent that is subjected to the methods of the present disclosure includes contaminants at a concentration of 5 wt-% or less, 2 wt-% or less, 1 wt-% or less, 0.5 wt-% or less, 0.2 wt-% or less, or 0.1 wt-% or less. In some embodiments, the waste solvent is the waste solvent from a chromatographic separation. The contaminants may include pharmaceutical components, reagents used to prepare pharmaceutical components, byproducts or breakdown products of pharmaceutical components, or impurities related to manufacturing of the pharmaceutical components.

The systems and methods of the present disclosure may be used to separate many different types of solvents, e.g., organic solvents. The systems and methods may be particularly useful for separating solvents that form azeotropes either with water or with other solvents. Solvents that tend to form an azeotrope are referred to here as azeotrope-forming solvents. Examples of such solvents include acetonitrile, ethanol, methanol, isopropanol, butanol, ethyl acetate, acetone, chloroform, diethyl ether, halothane, benzene, and hexafluorobenzene. Other azeotrope-forming solvents exist. According to an embodiment, the solvent of interest is an azeotrope-forming solvent and the system and methods are configured for the separation and concentration of the azeotrope-forming solvent. The systems and methods may be particularly useful for separating solvents from waste solvents that include non-solvent components (e.g., contaminants). For example, waste solvents used in manufacturing and/or purifying other chemicals, such as pharmaceutical components. Acetonitrile is a solvent commonly used in HPLC chromatography, including at industrial scale. According to an embodiment, the solvent of interest is acetonitrile and the system and methods are configured for the separation and concentration of acetonitrile. The acetonitrile may be present in an aqueous waste solvent stream.

The solvent of interest (e.g., an organic solvent) and the second solvent (e.g., water or another organic solvent) may constitute the majority of the waste solvent. For example, the solvent of interest (e.g., an organic solvent) and the second solvent (e.g., water or another organic solvent) may make up more than 90 wt-%, more than 95 wt-%, more than 98 wt-%, or more than 99 wt-% of the waste solvent. The remainder of the waste solvent may include other solvents, buffering agents (e.g., acids, bases, or both), salts, residual larger molecules (e.g., pharmaceutical and biopharmaceutical components) and breakdown products thereof, and other residual solids. In some embodiments, the waste solvent is a waste stream of a peptide production process (e.g., insulin production) and the residual larger molecules may include residual peptides, cleaved peptides, and breakdown products of the peptides. The buffering agents and salts may include those commonly used in the art in the production of peptides or other pharmaceutical products.

The method of separating and concentrating the waste solvent includes separating non-solvent components from the solvent components, and separating the solvent of interest from the second solvent and any optional additional solvents present in the waste solvent. Separating the non-solvent components from the solvent components may involve one or more filtration steps, such as microfiltration, nanofiltration, ultrafiltration, or any combination thereof. Separating the non-solvent components from the solvent components may involve nanofiltration, e.g., membrane filtration. Separating the non-solvent components from the solvent components may further include other steps, such as pH adjustment, buffering, complexing, effecting other chemical reactions, and other (additional) filtration steps (e.g., microfiltration, nanofiltration, ultrafiltration, and the like), or any combination thereof. Separating the non-solvent components from the solvent components may involve causing one or more of the non-solvent components to precipitate and filtering out the precipitate.

According to an embodiment, the method includes separating non-solvent components from the solvent components prior to exposing the waste solvent to an elevated temperature (e.g., in a distillation or pervaporation step). The waste solvent may be mixed with a buffer or other component or mixture of components. In some embodiments, the waste solvent is mixed with an acid or a base. For example, if the waste solvent is acidic, it may be mixed with a base to raise or neutralize the pH. Raising or neutralizing the pH may be beneficial to for compatibility with filtration membranes, such as a nanofiltration membrane, which may degrade at a low pH. Further, mixing for example a basic compound with an acidic waste solvent may cause acidic molecules to complex with the basic compound, thus helping to separate small acid molecules from the waste solvent via nanofiltration. The pH of the waste solvent may be raised by 1-3 pH units. Examples of basic compounds include inorganic bases such as sodium bicarbonate; strong bases such as sodium hydroxide; and organic bases such as trisaminomethane, polyethyleneimine, and triethylamine. The waste solvent may also be mixed with one or more complexing agents, such as magnesium chloride or ferric chloride.

After mixing the waste solvent with the buffer of other component or mixture of components, the mixture is filtered to remove any solids and larger molecules and complexed compounds or ions (collectively referred to here as contaminants). The contaminants may be dissolved or suspended in the waste solvent. In some embodiments, the filtration (e.g., first filtration step) includes microfiltration, nanofiltration, ultrafiltration, or any combination thereof. In some embodiments, the filtration (e.g., first filtration step) includes nanofiltration of the mixture. In some embodiments, the filtration includes more than one filtration mode. For example, the filtration may include a combination of microfiltration and nanofiltration. The filtration may include a combination of microfiltration, nanofiltration, and ultrafiltration. The filtration may include a combination of nanofiltration and ultrafiltration. In some embodiments, the mixture is filtered using nanofiltration. Nanofiltration may involve the use of a nanofiltration membrane. The nanofiltration membrane may be selected based on the molecular weight of the contaminants. For example, the nanofiltration membrane may be selected to have a specific molecular weight cutoff, such as 100 Da, 200 Da, 500 Da, 750 Da, or 1000 Da. Nanofiltration membranes may be made of polymeric materials. An example of a suitable nanofilter material is cellulose acetate. The permeate from the nanofiltration includes contaminants at a concentration that is lower than the waste solvent, and the retentate includes the contaminants at a concentration that is higher than the waste solvent.

According to an embodiment, the majority of or substantially all non-solvent components are removed from the waste solvent prior to increasing the temperature of the waste solvent to above ambient temperature (about 20° C. to 25° C.) or to above about 40° C. For example, the majority of or substantially all non-solvent components are removed from the waste solvent prior to distillation or evaporation. In an exemplary embodiment, the waste solvent initially includes contaminants (other than the solvent of interest and a second solvent such as water) at a concentration of 0.01 wt-% or greater, 0.05 wt-% or greater, 0.1 wt-% or greater, 0.5 wt-% or greater, 1 wt-% or greater, 2 wt-% or greater, or 5 wt-% or greater. There is no particular upper limit on the amount of contaminants but in practice, the waste solvent may include up to 20 wt-% or up to 10 wt-% of contaminants. The contaminants may include both dissolved solids and suspended solids. After separating non-solvent components from the waste solvent by nanofiltration, the remaining solvent stream may include 1 wt-% or less, 0.5 wt-% or less, 0.2 wt-% or less, 0.1 wt-% or less, 0.05 wt-% or less, or 0.01 wt-% or less of non-solvent contaminants. After separating non-solvent components from the waste solvent, the remaining solvent stream may consist of or consist essentially of the solvent of interest and a second solvent and optionally subsequent solvents.

Separating the solvent of interest from the second solvent may include evaporation or distillation to remove at least some (e.g., a majority) of the second solvent. The method may also include a second filtration step to further concentrate the solvent of interest. According to an embodiment, the evaporation step includes feeding a liquid or vapor-liquid mixture of two or more miscible components into an evaporator. The evaporator may be a single-stage evaporator or a multistage evaporator. A heat source, such as steam or hot oil, may be used to partially evaporate the mixture. The formed vapor is enriched in the lower boiling point component relative to the feed waste solvent, while the remaining liquid is enriched in the higher boiling point component. The vapor phase (rich in the lower boiling point component) and the liquid phase (rich in the higher boiling point component) may be separately removed from the evaporator. The vapor phase (rich in the lower boiling point component) may then be sent to the second filtration step (e.g., pervaporation) and the liquid phase (rich in the higher boiling point component) is removed from the process and repurposed or treated as waste and disposed of.

In another embodiment, a distillation column is used instead of a single-stage evaporator to achieve greater purity of the separated components. In a typical distillation column, vapor flows upward through the column while liquid flows downward. At the bottom of the column, a fraction of the liquid, called the "bottoms" product, is removed. The bottoms liquid is enriched in the higher boiling point component relative to the feed waste solvent. A heat source (e.g., steam or oil) evaporates the remaining liquid, driving vapor flow up the column. At the top of the column, a condenser at least partially condenses the vapor exiting the column. A fraction of this condensed liquid is removed as the "distillate" product. The distillate liquid is enriched in the lower boiling point component relative to the feed. The remaining condensate is returned to the top of the column. The distillate may include the solvent of interest at a concentration of 50 vol-% or greater, 60 vol-% or greater, 70 vol-% or greater, or 80 vol-% or greater, the balance being substantially made up of the second solvent (e.g., water or another organic solvent). The distillate may include an azeotrope of the solvent of interest. The bottoms may include the solvent of interest at a concentration of 50 vol-% or less, 40 vol-% or less, 30 vol-% or less, 20 vol-% or less, 10 vol-% or less, or 5 vol-% or less, the balance being substantially made up of the second solvent (e.g., water or another organic solvent). The bottoms may include the second solvent (e.g., water or another organic solvent) at a concentration of 50 vol-% or greater, 60 vol-% or greater, 70 vol-% or greater, 80 vol-% or greater, or 90 vol-% or greater. The ratio of liquid returned to the column to liquid removed as distillate, known as the "reflux ratio," typically ranges from 0 to 50, although there is no theoretical maximum. The heater and condenser at opposite ends of the column establish a temperature gradient along the column, which ranges from the boiling point of the lowest boiling point component at the top to that of the highest boiling point component at the bottom. The column may be separated into multiple stages by trays such as bubble-cap trays, sieve trays, or valve trays, or it may be filled with packing material such as perforated sheet metal or Raschig packing rings. The trays or packing increase the surface area for contact between the vapor and liquid phases. This contact leads to partial evaporation and simultaneous condensation of liquid and vapor throughout the column. In conjunction with the temperature gradient, this causes the vapor to become more enriched in the lower boiling point component as it moves up the column while the liquid becomes more enriched in the higher boiling point component as it moves down the column. Generally, taller columns (more stages or greater packed height) will yield greater purity of the outlet streams.

In some embodiments, a liquid waste solvent containing both acetonitrile and water is fed into a distillation column. Acetonitrile, which boils at a lower temperature than water, is enriched in the vapor phase moving up the column. Water is enriched in the liquid phase moving down the column. The distillate product is primarily acetonitrile. However, the distillate cannot be further concentrated past the azeotrope, which is approximately 85 vol-% acetonitrile and 15 vol-% water, by distillation. The bottoms product is primarily water and may be greater than 90% or 95% water and less than 10% or 5% acetonitrile.

After evaporation or distillation, the stream rich in the solvent of interest (the term "enriched solvent" is used hereinafter for brevity) may be further purified, while the steam rich in the solvent to be removed may be returned to the waste solvent stream or removed from the system. In an exemplary embodiment, the solvent of interest is acetonitrile, and the stream rich in acetonitrile is further purified, and the solvent to be removed is water, and the stream rich in water is returned to the waste solvent stream or removed from the system.

The enriched solvent if then further purified in a second filtration step. The enriched solvent (the feed stream to the second filtration) may include the solvent of interest at a concentration of 50 vol-% or greater, 60 vol-% or greater, 70 vol-% or greater, or 80 vol-% or greater, the balance being substantially made up of the second solvent (e.g., water or another organic solvent). The enriched solvent (the feed stream to the second filtration) may include an azeotrope of the solvent of interest. The second filtration step may be selective either toward the solvent of interest or the second solvent. The second filtration step may involve pervaporation, evaporation, or a combination thereof. In some embodiments, the second filtration step is a pervaporation step. Pervaporation is a separation process that typically uses a selective membrane and a combination of permeation and evaporation. A pervaporation system may include a membrane with a feed side and a permeate side, where a vacuum is applied to the permeate side. The membrane may be selective for the solvent of interest. The permeate containing the solvent of interest may be recovered as a vapor on the downstream side of the membrane, and may be further condensed using a condenser. Pervaporation may be conducted in a pervaporation column housing the membrane. The pervaporation membrane may be made of any suitable material. Examples of pervaporation membrane materials include polymer thin films such as poly(vinyl alcohol) or amorphous fluoropolymer, zeolites, silicates, hydrophilic functionalized hybrid silicas, and combinations and composites of any two or more thereof. For example, the pervaporation membrane may be made of a ceramic material, optionally coated with another material, such as zeolite. The temperature and pressure used in the second filtration step may be selected to effect the desired separation mode (e.g., pervaporation, evaporation, or a combination thereof.) The temperature, pressure, and flow rate used in the second filtration step may further be selected to achieve the desired purity of the recovered solvent of interest. It may be desirable to operate the pervaporation using a combination of parameters that maintains the feed (enriched solvent) below its boiling point. Such combinations of parameters will depend on the specific combination of solvents. As an example, if the enriched solvent is an acetonitrile-water mixture (e.g., an azeotrope of acetonitrile and water), the temperature and pressure of the pervaporation operation may be maintained below 76.4° C. and 1 atm, or below 98° C. and 2 atm, or below 112° C. and 3 atm, or below 123° C. and 4 atm, or below 131° C. and 5 atm, etc. According to an embodiment, the enriched solvent is condensed and/or cooled after the distillation or evaporation step prior to introducing to the second filtration step (e.g., pervaporation). In some embodiments, the feed stream to the second filtration step (e.g., pervaporation) contains less than 0.1 wt-%, less than 0.01 wt-% of vapor or no vapor by weight of the enriched solvent.

The enriched solvent may be continually passed through the pervaporation system until the purified solvent output steam has a solvent concentration of 90 vol-% or greater, 95 vol-% or greater, 96 vol-% or greater, 97 vol-% or greater, 98 vol-% or greater, 99 vol-% or greater, 99.5 vol-% or greater, 99.8 vol-% or greater, or 99.9 vol-% or greater. Depending on the selectivity of the pervaporation membrane, the purified solvent output stream may be the retentate or the permeate.

In some embodiments, the waste solvent is a waste steam from a chromatography process. In some embodiments, the purified solvent output stream is re-used in a chromatography process.

In one exemplary embodiment, the method is used to separate a solvent of interest from a waste solvent that is a mixture of the solvent of interest and a second solvent. The second solvent may be another organic solvent or solvent mixture or water. The mixture may also include other components (e.g., contaminants) such as buffering agents, pH adjusting agents, salts, residual peptides and fragments of peptides, other residual solids, or any combination thereof. The mixture may include approximately 10 to 90 vol-% of the solvent of interest. The mixture may be first mixed with one or more compounds that cause precipitation of one or more of the contaminants in the mixture. Compounds that cause precipitation may include, for example, pH adjusting agents (e.g., acids and bases), salts, organic or inorganic compounds selected to react with one or more of the contaminants, etc. In one embodiment, the mixture is buffered to a predetermined pH level with a pH adjusting agent and optionally a salt. The non-solvent components are then separated using a first filtration step. The first filtration step may be, for example, nanofiltration. The nanofilter may be selected based on the components that are desired to be removed. For example, the nanofilter may have a molecular weight cut-off in a range of about 200 Da to 600 Da, and may be capable of removing buffering agents, pH adjusting agents, salts, residual peptides and fragments of peptides, and other residual solids from the solvent mixture. The filtered solvent mixture is then distilled to remove at least some (e.g., a majority) of the second solvent. The distillate (distilled solvent mixture) may include approximately 80 vol-% of the solvent of interest. The concentration of the solvent of interest may be adjusted (up to the azeotropic mixture) by adjusting the distillation conditions. The distillate is further concentrated in a second filtration step. The second filtration step may be a nanofiltration step. The second filtration step may involve pervaporation, evaporation, or a combination thereof. The temperature and pressure used in the second filtration step may be selected to effect the desired separation mode (e.g., pervaporation, evaporation, or a combination thereof.) The filter may be selected to be highly selective for either the solvent of interest or the second solvent. In one exemplary embodiment, the second filter is a zeolite-containing filter that allows the second solvent to pass through while retaining the solvent of interest. The temperature, pressure, and flow rate used in the second filtration step may further be selected to achieve the desired purity of the recovered solvent of interest. The solvent of interest may be recovered from the second filtration step at a purity of 90 vol-% or greater, 95 vol-% or greater, 96 vol-% or greater, 97 vol-% or greater, 98 vol-% or greater, 99 vol-% or greater, 99.5 vol-% or greater, 99.8 vol-% or greater, or 99.9 vol-% or greater.

In one exemplary embodiment, the method is used to separate acetonitrile from a mixture of water and acetonitrile that may also include other components such as buffering agents, pH adjusting agents, salts, residual peptides and fragments of peptides, other residual solids, or a combination thereof. The mixture may include approximately 20 to 50 vol-% acetonitrile. The mixture is first buffered to a predetermined pH level. The non-solvent components are then separated using nanofiltration. The nanofilter may be selected based on the components that are desired to be removed. For example, the nanofilter may have a molecular weight cut-off in a range of about 200 Da to 600 Da, and may be capable of removing buffering agents, pH adjusting agents, salts, residual peptides and fragments of peptides, and other residual solids from the solvent mixture. The filtered solvent mixture is then distilled to remove at least some (e.g., a majority) of the water. The distillate (distilled solvent mixture) may include approximately 80 vol-% acetonitrile. The concentration of acetonitrile may be adjusted (up to the azeotropic mixture) by adjusting the distillation conditions. The distillate is further concentrated in a second filtration step. The second filtration step may involve pervaporation, evaporation, or a combination thereof. The temperature and pressure used in the second filtration step may be selected to effect the desired separation mode (e.g., pervaporation, evaporation, or a combination thereof.) The filter may be selected to be highly selective for either water or acetonitrile. In one exemplary embodiment, the second filter is a zeolite-containing filter that allows water to pass through while retaining acetonitrile. The temperature, pressure, and flow rate used in the second filtration step may further be selected to achieve the desired purity of the recovered acetonitrile. The acetonitrile may be recovered from the second filtration step at a purity of 90 vol-% or greater, 95 vol-% or greater, 96 vol-% or greater, 97 vol-% or greater, 98 vol-% or greater, 99 vol-% or greater, 99.5 vol-% or greater, 99.8 vol-% or greater, or 99.9 vol-% or greater.

An exemplary diagram of a system according to the present disclosure is shown in FIG. 1. The system 1 includes a feed line 11 into a first filter 10. The feed composition fed through the feed line 11 may be a waste solvent stream. The first filter 10 may be a nanofilter. The first filter 10 may include a separation membrane. The first filter 10 may be constructed to remove components other than solvents from the feed composition. Downstream of the first filter 10, the system 1 includes a distillation column 20. The filtered composition is led from the first filter 10 (e.g., from the permeate side of the first filter 10) to the distillation column 20 via line 12. In the distillation column 20, the filtered composition is distilled to concentrate the solvent of interest. The concentrated solvent stream is then led from the distillation column 20 to a second filter 30 via line 13. The second filter 30 may be a nanofilter that is different from the first filter 10. The second filter 30 is constructed to further concentrate the solvent to a desired end concentration. The second filter 30 may constructed to be operated under conditions that concentrate the solvent of interest to above an azeotropic concentration of the solvent of interest and the second solvent. The second filter 30 has an outlet line 15 that outputs the purified concentrated solvent. The distillation column 20 may have an outlet line 14 for removing the second solvent from the system. The second filter 30 may also have an outlet line, such as a recycle line 16, that returns a low-concentration stream (e.g., a retentate or permeate, depending on the construction and arrangement of the filter) to the distillation column 20. In embodiments where the filter passes through the solvent of interest at a high concentration and retains the second solvent, the retentate may be returned to the distillation column. In embodiments where the filter retains the solvent of interest, the permeate may be returned to the distillation column. The system 1 may further include additional components, such as storage tanks, mixing tanks, feed lines, bleed lines, outlets, valves, pumps, heaters, coolers, heat exchangers, etc.

Figure 2:
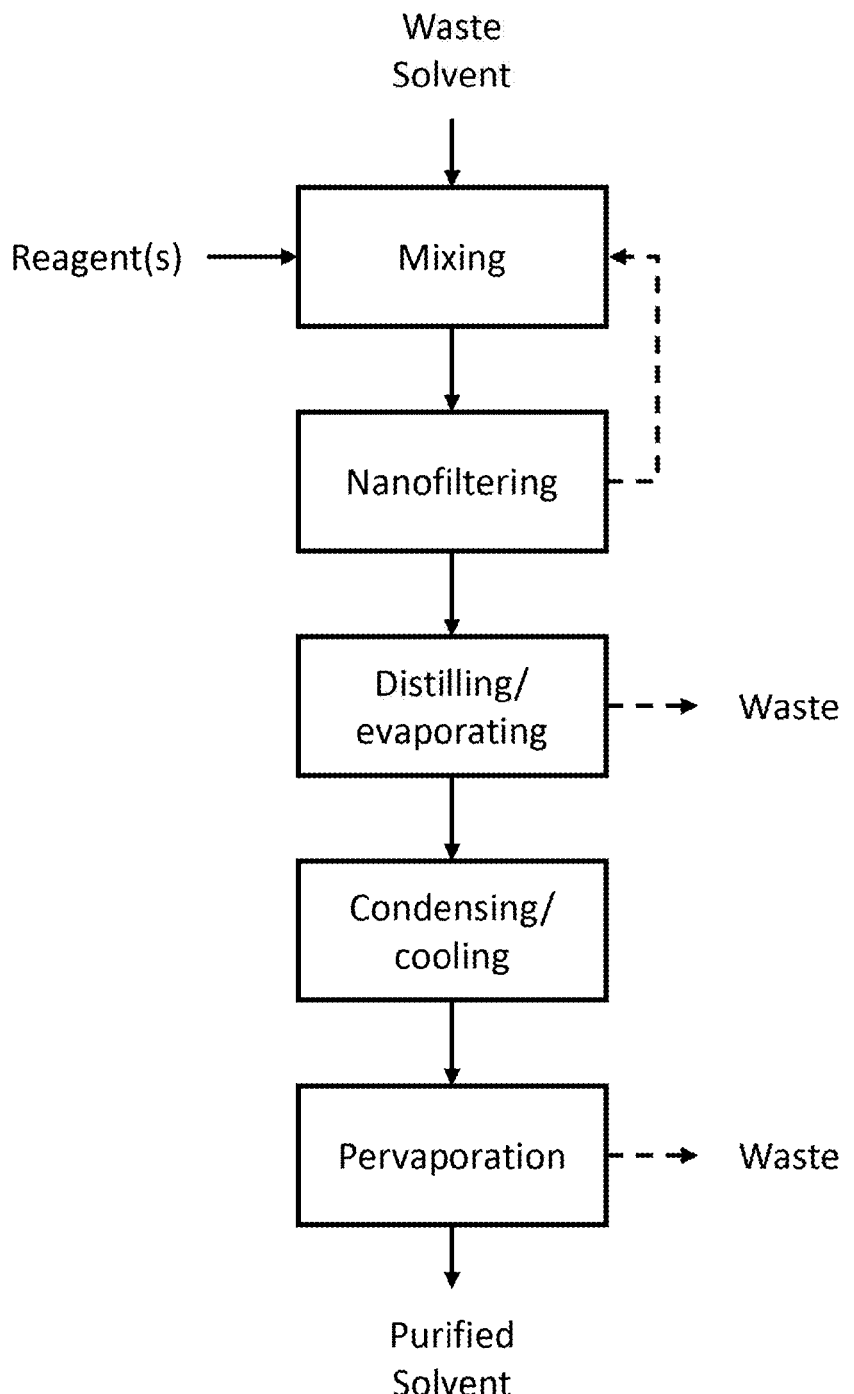
FIG. 2 is a schematic flow diagram of a solvent recovery method according to an embodiment.

In some embodiments, the method includes distillation of the permeate from nanofiltration. A flow diagram of such a method is shown in FIG. 2. First, one or more reagents are mixed with the waste solvent in a mixing tank. The mixture is then nanofiltered. The retentate may optionally be returned to the mixing tank or may be discarded as waste. The permeate from nanofiltration is directed to a distillation column or an evaporator. The bottoms of the distillation or evaporation may be discarded as waste. The distillate or evaporate may be cooled or condensed. The cooled or condensed mixture is then purified by pervaporation.

Figure 3:
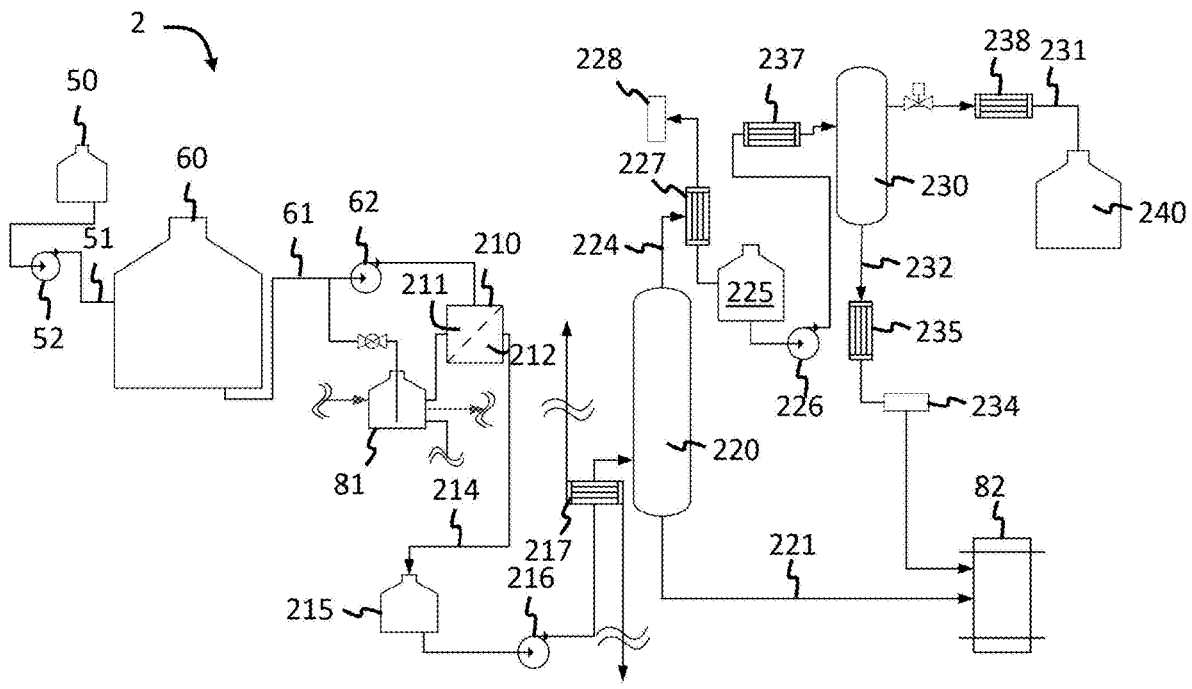
FIG. 3 is a schematic system diagram of a solvent recovery system according to an embodiment.

Another exemplary embodiment of the system 2 is shown in FIG. 3. The system 2 includes a buffer tank 50 that feeds into a mixing tank 60 via a feed line 51 and pump 52. The mixing tank 60 may be used to mix the waste solvent with a buffering agent, pH adjusting agent, or other components that may facilitate separation of non-solvent components from the solvents. The mixing tank 60 feeds into a first filter 210 via a feed line 61 and pump 62. The first filter 210 has a retentate side 211 and a permeate side 212. The retentate side 211 may feed a stream containing the non-solvent components into a first waste tank 81. The permeate side 212 feeds a solvent stream into the distillation column 220 via line 214, tank 215, and pump 216. The line 214 may include a heat exchanger 217. The bottoms of the distillation column 220 containing the second solvent are fed into a second waste tank 82 via waste line 221. The distillate (distilled solvent mixture) is fed into a second filter 230 (e.g., a pervaporation column) via line 224, tank 225, and pump 226. The line 224 may also include heat exchangers 227 and 237. A vacuum pump 228 may be used to draw a vacuum into the distillation column 220. Depending on the selected membrane in the second filter 230, the solvent of interest may be either in the retentate or in the permeate of the second filter 230. In the exemplary embodiment shown, the purified solvent of interest is in the retentate line 231 and is led into a recovery tank 240. The retentate line 231 may include heat exchanger 238. The permeate may be led into the second waste tank 82 via permeate line 232. The permeate line 232 may further include a vacuum pump 234 and a heat exchanger 235. The system 2 may further include additional components, such as storage tanks, mixing tanks, feed lines, bleed lines, outlets, valves, pumps, heaters, coolers, heat exchangers, etc.

Figure 5:
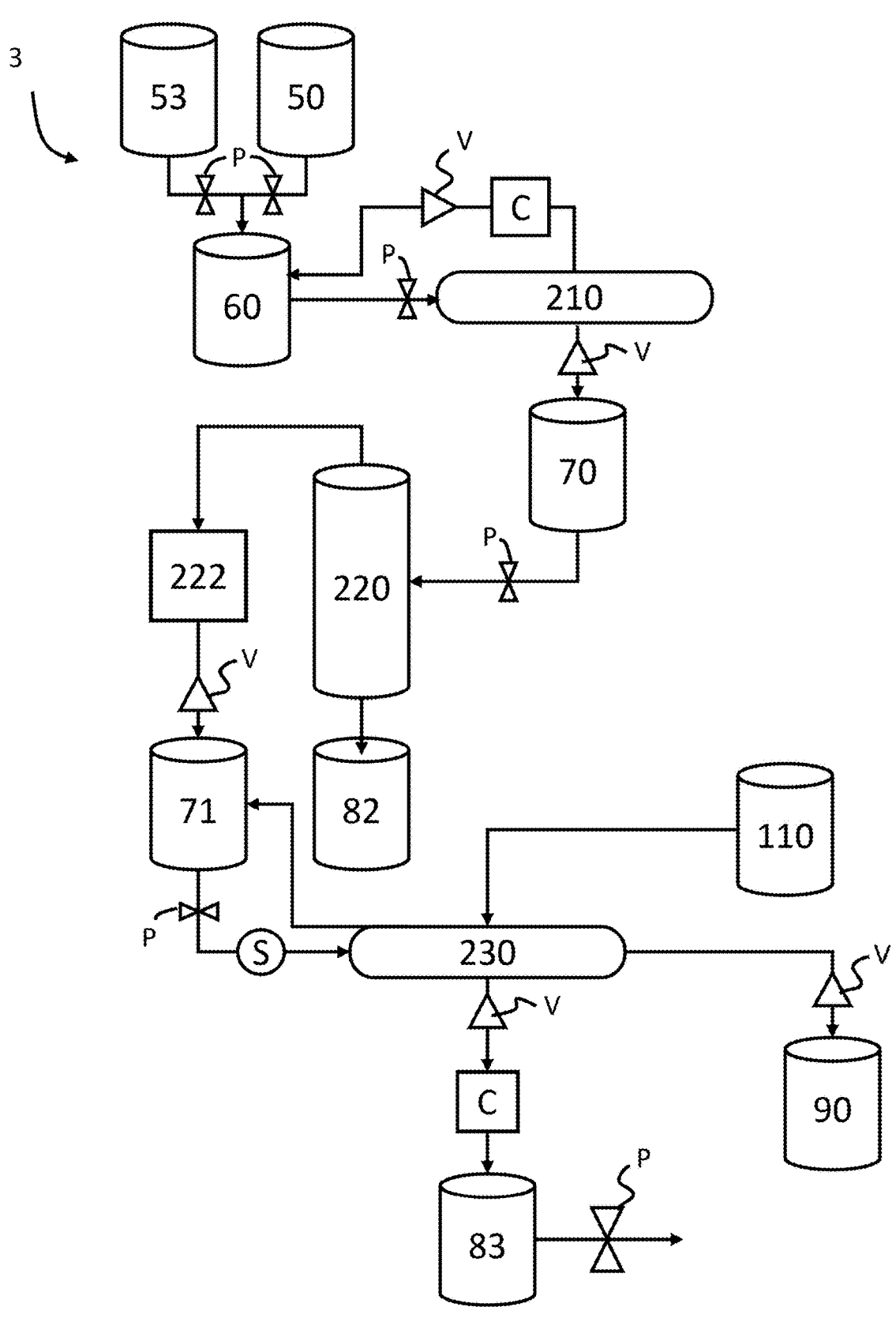
FIG. 5 is a schematic system diagram of a solvent recovery system according to an embodiment.

Another exemplary embodiment of a system 3 is shown in FIG. 5. The system includes a tank 53 of waste solvent that is pumped into a mixing tank 60. Buffer solution from tank 50 is pumped into a mixing tank 60 to bring the waste solvent to a desired pH. Once the desired pH is achieved, the waste solvent is pumped through a nanofilter 210 to remove non-solvent components. The permeate from the nanofilter 210 may be temporarily stored in a tank 70 prior to being directed to a distillation column 220. The retentate may be circled back into the mixing tank 60 or may be discarded. The distillation column 220 will enrich the solvent of interest. The distillate may be condensed in a condenser 222 and may be optionally collected in a tank 71. The enriched second solvent (bottoms) may be collected in a waste tank 82. The distilled solvent of interest will continually pass through a purity sensor S and a second filter 230 (pervaporation column) becoming more enriched. The pervaporation column may be provided with heating fluid from tank 110. The second solvent may be pulled under vacuum and collected in a waste tank 83. Once the target purity has been achieved for the solvent of interest, the system will pump the reclaimed solvent into tank 90. The system may include several valves V, pumps P, and condensers C. Additional valves, pumps, condensers, meters, sensors, lines, storage tanks, controls, etc. may be included.

According to an embodiment, the first filter is selected based on the solvents and the non-solvents desired to be removed from the solvents. The first filter may be selected to remove salts, acids, bases, complexed molecules, organic molecules other than the solvents, and other solids that may be present in the waste solvent.

In some embodiments, one or more non-solvent components of the waste solvent are reacted or complexed with another ion or molecule to facilitate separation from the solvents. Depending on the desired size of the resulting complex, molecule, or salt, the complexing agent or counterion may be a monomer, an oligomer, or a polymer. For example, trifluoroacetic acid ("TFA"), which is small molecule commonly used as a pH adjusting agents in buffers (e.g., in peptide production processes), may be complexed or reacted with a base to make it easier to remove. Exemplary bases that may be suitable for reacting with TFA include various amines, such as triethylamine and its oligomeric and polymeric forms, such as polyethylamine.

According to an embodiment, the second filter is selected based on the solvent of interest and/or the second solvent. The second filter may be highly selective for either the solvent of interest or the second solvent. For example, the second filter may be highly selective for an organic solvent or for water. The second filter may include a semipermeable selective separation membrane. The second filter may be a separation membrane arranged for pervaporation, evaporation, or a combination thereof. In one exemplary embodiment, the second filter is a separation membrane that includes an absorbent, adsorbent, or a porous particle. Examples of suitable absorbents, adsorbents, and porous particles include zeolites, silica gels, ceramic particles, carbon nanotubes, and the like. The absorbents, adsorbents, or porous particles may be provided as a layer or may be embedded in the pores of the separation membrane. In one embodiment, the second filter includes a separation membrane with zeolite particles.

According to an embodiment, the system may include one or more meters or sensors to monitor the progress of the separation and purification throughout the method. For example, the system may include one or more sensors to detect the concentration of the first solvent or the second solvent or both. Such sensors may be operatively connected to a control system and may be used to control various parameters, such as temperature, pressure, dwell time, etc. of unit operations. Examples of sensors that may be included in the system include capacitance, dielectric, and optical based measurement systems. Capacitance and dielectric systems work by measuring the dielectric permittivity of the mixture of liquid in the waste stream. Examples of these systems are those available for purchase from Liebherr (Bulle, Switzerland). Optical measurement systems work by measuring light absorbed or scattered by the waste solvent. Attenuation of light passing through the solvent is typically measured in the ultraviolet, infrared, or near infrared wavelengths and is a combination of attenuation by all chemical species present in the optical beam path. Examples of ultraviolet and infrared sensors are those commercially available by Pendotech (Princeton, NJ). Scattered light is used in Raman spectroscopy and also contains information of all chemical species present in the optical beam path. Examples of Raman detectors are those available from Wasatch Photonics (Orlando, FL). In one embodiment, the system includes one or more sensors capable of measuring water content. In one embodiment, the system includes one or more sensors capable of measuring acetonitrile content. In one embodiment, the system includes one or more sensors capable of measuring water content during pervaporation. In one embodiment, the system includes a water sensor arranged to determine water content downstream of the pervaporation membrane.

In one or more embodiments, the system may be described as including a control unit. Such control units may include one or more programmable processors that include processing capabilities (for example, microcontrollers or programmable logic devices), data storage (for example, volatile or non-volatile memory or storage elements), input devices, and output devices. Program code, or logic, described herein may be applied to input data to perform functionality described herein and generate desired output information. The output information may be applied as input to one or more other devices or processes as described herein or as would be applied in a known fashion. The exact configuration of the control unit is not limiting and essentially any device capable of providing suitable computing capabilities and control capabilities to implement the method may be used.

According to an embodiment, the process conditions during the separation and concentration process are selected to avoid or minimize thermal degradation products in the waste solvent and in the product stream (solvent of interest and low-concentration solvent stream). Thermal degradation products may be compounds that are formed when one or more contaminants or solvents are exposed to high temperatures. The method may be used to separate and purify acetonitrile such that the resulting purified acetonitrile contains less than 500 ppm, less than 200 ppm, less than 100 ppm, less than 50 ppm, less than 20 ppm, less than 10 ppm, or less than 5 ppm of thermal degradation products. For example, the method may be used to separate and purify acetonitrile without the formation of nitrosamines. The method may be used to separate and purify acetonitrile such that the resulting purified acetonitrile contains less than 500 ppm, less than 200 ppm, less than 100 ppm, less than 50 ppm, less than 20 ppm, less than 10 ppm, or less than 5 ppm of nitrosamines. The resulting purified acetonitrile free or substantially free of nitrosamines. Thus, it may be desirable to avoid very high temperatures (e.g., temperatures above 140° C.) and combinations of high temperature and pressure (e.g., temperature and pressure combinations typically used in pressure swing distillation). The method may be performed without increasing the temperature of the waste solvent to 120° C. or greater, 100° C. or greater, 90° C. or greater, 80° C. or greater, 70° C. or greater, or 60° C. or greater. The method may be performed without increasing the temperature of the solvent of interest to 120° C. or greater, 100° C. or greater, 90° C. or greater, 80° C. or greater, 70° C. or greater, or 60° C. or greater. The method may be performed without exposing the waste solvent to a combination of temperature of 100° C. or greater and pressure of 250 kPa or greater, 80° C. or greater and 80 kPa or grater, 70° C. or greater and 60 kPa or greater, or 65° C. or greater and 30 kPa or greater. The method may be performed without exposing the solvent of interest to a combination of temperature of 100° C. or greater and pressure of 250 kPa or greater, 80° C. or greater and 80 kPa or grater, 70° C. or greater and 60 kPa or greater, or 65° C. or greater and 30 kPa or greater.

According to an embodiment, the separation and concentration methods are performed without adding another solvent to the mixture to act as an entrainer. For example, the method may be performed without adding benzene to the waste solvent or to the solvent or interest.

Embodiments

A list of exemplary embodiments is provided below.

Embodiment 1 is a system comprising:

a first mixing tank comprising a waste solvent feed and a reactant feed;

a first filter comprising a nanofiltration membrane configured to receive flow from the first mixing tank;

a distillation column or an evaporator, configured to receive permeate from the first filter;

a condenser or cooler configured to condense or cool flow from the distillation column or evaporator; and a pervaporation membrane configured to receive condensed or cooled flow from the condenser or cooler.

Embodiment 2 is the system of embodiment 1, wherein the waste solvent feed comprises a feed stream from a chromatographic separation system.

Embodiment 3 is the system of embodiment 1 or 2, wherein the waste solvent feed comprises pharmaceutical components, reagents used to prepare pharmaceutical components, byproducts or breakdown products of pharmaceutical components, or impurities related to manufacturing of the pharmaceutical components.

Embodiment 4 is the system of any one of embodiments 1 to 3 further comprising a microfilter arranged between the first mixing tank and the first filter or between the first filter and the distillation column.

Embodiment 5 is the system of any one of embodiments 1 to 4 further comprising an ultrafilter arranged between the first mixing tank and the first filter or between the first filter and the distillation column.

Embodiment 6 is the system of any one of embodiments 1 to 5, wherein the condenser or cooler is configured to receive a distillate from the distillation column.

Embodiment 7 is a method of comprising:

mixing a waste solvent with a reactant to cause precipitation or complexing and forming a mixture;

filtering the mixture using a nanofiltration membrane and forming a permeate;

distilling or evaporating the permeate to form a concentrated solvent;

condensing or cooling the concentrated solvent to below a boiling point of solvents in the concentrated solvent; and filtering the concentrated solvent using pervaporation to form a purified solvent.

Embodiment 8 is the method of embodiment 7, wherein the waste solvent comprises a first solvent and a second solvent and at least one contaminant.

Embodiment 9 is the method of embodiment 7 or 8, wherein the waste solvent comprises contaminants at a concentration of 0.01 wt-% or greater, 0.05 wt-% or greater, 0.1 wt-% or greater, 0.5 wt-% or greater, 1 wt-% or greater, 2 wt-% or greater, or 5 wt-% or greater.

Embodiment 10 is the method of any one of embodiments 7 to 9, wherein the waste solvent feed comprises pharmaceutical components, reagents used to prepare pharmaceutical components, byproducts or breakdown products of pharmaceutical components, or impurities related to manufacturing of the pharmaceutical components.

Embodiment 11 is the method of any one of embodiments 8 to 10, wherein the reactant reacts with or complexes with the at least one contaminant.

Embodiment 12 is the method of any one of embodiments 7 to 11, wherein the waste solvent comprises a chromatographic separation waste steam.

Embodiment 13 is the method of any one of embodiments 7 to 12 further comprising directing the waste solvent from a chromatographic separation system to a mixing tank for mixing the waste solvent with the reactant.

Embodiment 14 is the method of any one of embodiments 7 to 13, wherein the reactant comprises a buffer.

Embodiment 15 is the method of any one of embodiments 7 to 14, wherein the reactant comprises a base, optionally comprising sodium bicarbonate, magnesium chloride, ferric chloride, sodium hydroxide, trisaminomethane, polyethyleneimine, triethylamine, or a combination of any two or more thereof.

Embodiment 16 is the method of any one of embodiments 7 to 15, wherein the first solvent comprises acetonitrile, ethanol, methanol, isopropanol, butanol, ethyl acetate, acetone, chloroform, diethyl ether, halothane, benzene, hexafluorobenzene, or a combination of any two or more thereof.

Embodiment 17 is the method of any one of embodiments 7 to 16, wherein the first solvent is acetonitrile.

Embodiment 18 is the method of any one of embodiments 7 to 17, wherein the second solvent comprises water or an organic solvent different from the first solvent.

Embodiment 19 is the method of any one of embodiments 7 to 18, wherein the second solvent is water.

Embodiment 20 is the method of any one of embodiments 7 to 19, wherein the distillate comprises an azeotrope.

Embodiment 21 is the method of any one of embodiments 7 to 20, wherein the distillate comprises the first solvent at a concentration of 50 vol-% or greater, 60 vol-% or greater, 70 vol-% or greater, or 80 vol-% or greater.

Embodiment 22 is the method of any one of embodiments 7 to 21, wherein the distillate comprises 80 vol-% or more of acetonitrile and 15 vol-% or less of water, or about 85 vol-% acetonitrile and about 15 vol-% water.

Embodiment 23 is the method of any one of embodiments 7 to 22, wherein the permeate is free of non-solvent contaminants.

Embodiment 24 is the method of any one of embodiments 7 to 23, wherein after nanofiltration and prior to distillation, the waste solvent has a concentration of 1 wt-% or less, 0.5 wt-% or less, 0.2 wt-% or less, 0.1 wt-% or less, 0.05 wt-% or less, or 0.01 wt-% or less of contaminants.

Embodiment 25 is the method of any one of embodiments 7 to 24 further comprising microfiltration prior to the distilling.

Embodiment 26 is the method of any one of embodiments 7 to 25 further comprising ultrafiltration prior to the distilling.

Embodiment 27 is the method of any one of embodiments 7 to 26, wherein the method does not include increasing a temperature of the waste solvent to 120° C. or greater, 100° C. or greater, 90° C. or greater, 80° C. or greater, 70° C. or greater, or 60° C. or greater.

Embodiment 28 is the method of any one of embodiments 7 to 27, wherein the method does not include exposing the waste solvent to a combination of temperature of 100° C. or greater and pressure of 250 kPa or greater, 80° C. or greater and 80 kPa or grater, 70° C. or greater and 60 kPa or greater, or 65° C. or greater and 30 kPa or greater.

Embodiment 29 is the method of any one of embodiments 7 to 28, wherein the method does not include increasing a temperature of the first solvent to 120° C. or greater, 100° C. or greater, 90° C. or greater, 80° C. or greater, 70° C. or greater, or 60° C. or greater.

Embodiment 30 is the method of any one of embodiments 7 to 29, wherein the method does not include exposing the first solvent to a combination of temperature of 100° C. or greater and pressure of 250 kPa or greater, 80° C. or greater and 80 kPa or grater, 70° C. or greater and 60 kPa or greater, or 65° C. or greater and 30 kPa or greater.

Embodiment 31 is the method of any one of embodiments 7 to 30, wherein the nanofiltration membrane has a molecular weight cutoff between 100 Da and 1000 Da.

Embodiment 32 is the method of any one of embodiments 7 to 31, wherein the purified solvent comprises less than 500 ppm, less than 200 ppm, less than 100 ppm, less than 50 ppm, less than 20 ppm, less than 10 ppm, or less than 5 ppm of thermal degradation products.

Embodiment 33 is the method of any one of embodiments 7 to 32, wherein the purified solvent comprises less than 500 ppm, less than 200 ppm, less than 100 ppm, less than 50 ppm, less than 20 ppm, less than 10 ppm, or less than 5 ppm of nitrosamines.

Embodiment 34 is the method of any one of embodiments 7 to 33, wherein the purified solvent has a purity of 90 vol-% or greater, 95 vol-% or greater, 96 vol-% or greater, 97 vol-% or greater, 98 vol-% or greater, 99 vol-% or greater, 99.5 vol-% or greater, 99.8 vol-% or greater, or 99.9 vol-% or greater.

Embodiment 35 is the system of any one of embodiments 1 to 6 further comprising a control unit and one or more sensors operatively coupled to the control unit, wherein the one or more sensors are capable of sensing water content, solvent content, or both.

Embodiment 36 is the system of embodiment 35, wherein the one or more sensors comprises a water sensor arranged to determine water content downstream of the pervaporation membrane.

EXAMPLES

Example 1

A laboratory-scale system resembling the system in FIG. 3 was constructed and tested using a mixture of acetonitrile (30.37 vol-%) and water that also included peptides with a chain length ranging from C20 to C50 and a TFA buffer, having a pH of 2-3. The pH of the mixture was adjusted by the addition of a 0.83 M sodium bicarbonate until the pH of the final mixture was 5.35. After pH adjustment, the acetonitrile concentration was 23.48 vol-%. Following pH adjustment, the dissolved solids of the mixture were rejected using tangential flow filtration with an organic solvent nanofiltration cassette with a molecular weight cutoff of 300-500 Da (available from Evonik Industries AG in Essen, Germany) The feed spacer of the cassette was 31 mil thick with a total filtration area of 0.315 m². After several passes of the mixture through the filtration cassette, the dissolved solids content of the permeate was gravimetrically measured and showed a 75% rejection, as compared to the feed mixture.

Figure 4:
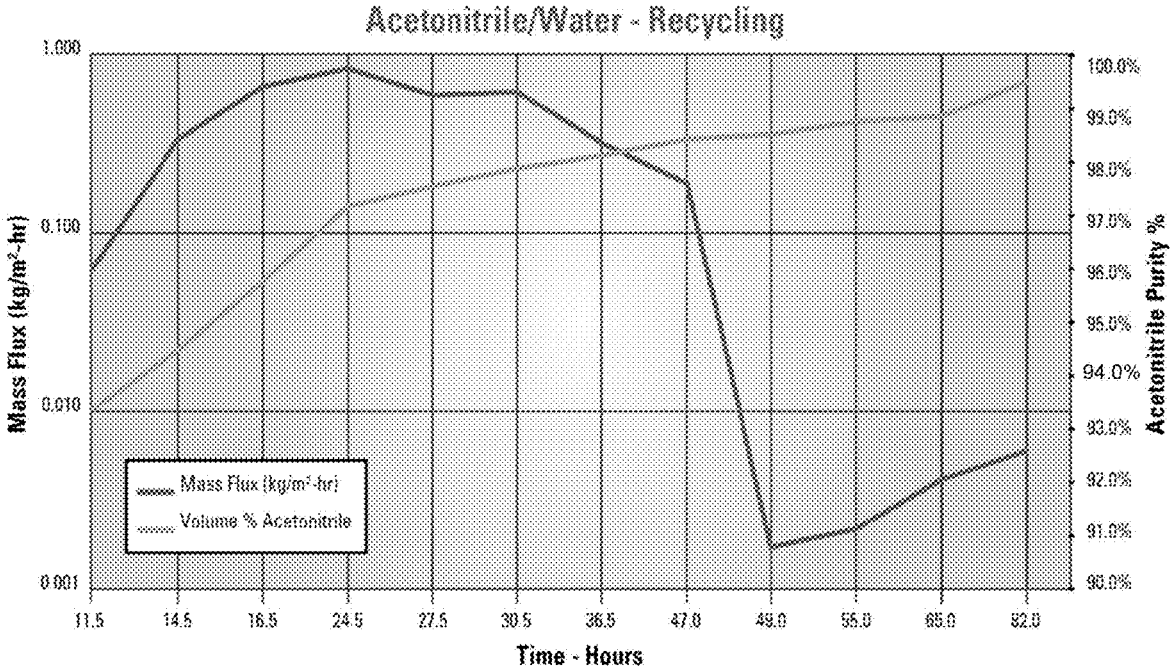
FIG. 4 is a data graph of results achieved using a solvent recovery system according to an embodiment.

After solids rejection, 1000 mL of the permeate mixture was subject to single stage distillation using a rotary evaporator. The feed to the evaporator was set at 50° C. and condenser was set at a pressure of 200 mmHg and a temperature of −5° C. Using this procedure, a sample of 185 mL of condensate with a water content of 25.2% was produced. This condensate mixture was subjected to pervaporation using a 0.013 m² pervaporation column (sourced from Media and Process Technology, in Pittsburgh, PA) at a temperature of 80° C. with a feed rate of 8 mL/min. The vapor side of the pervaporation system was held under vacuum and attached to a condenser to collect the water vapor. The water content of the retentate mixture was periodically measured using Karl Fischer titration and is shown in FIG. 4.

It was observed that HPLC waste solvent contained water and other contaminations. Standard methods of distillation would be unable to effectively clean and purify the waste solvent for the purpose of reuse. It was concluded that the combination of buffering, nanofiltration, evaporation, and pervaporation was the best method to successfully clean and purify HPLC waste solvent for the purpose of reuse.

Example 2

Figure 6A:
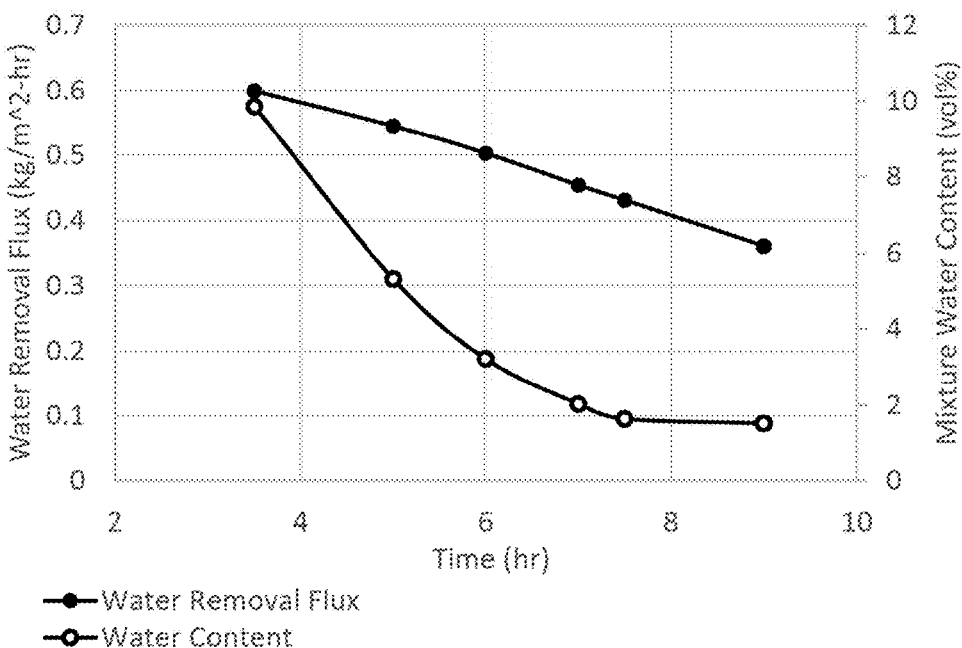
FIGS. 6A and 6B are graphical representations of data from Example 2.
Figure 6B:
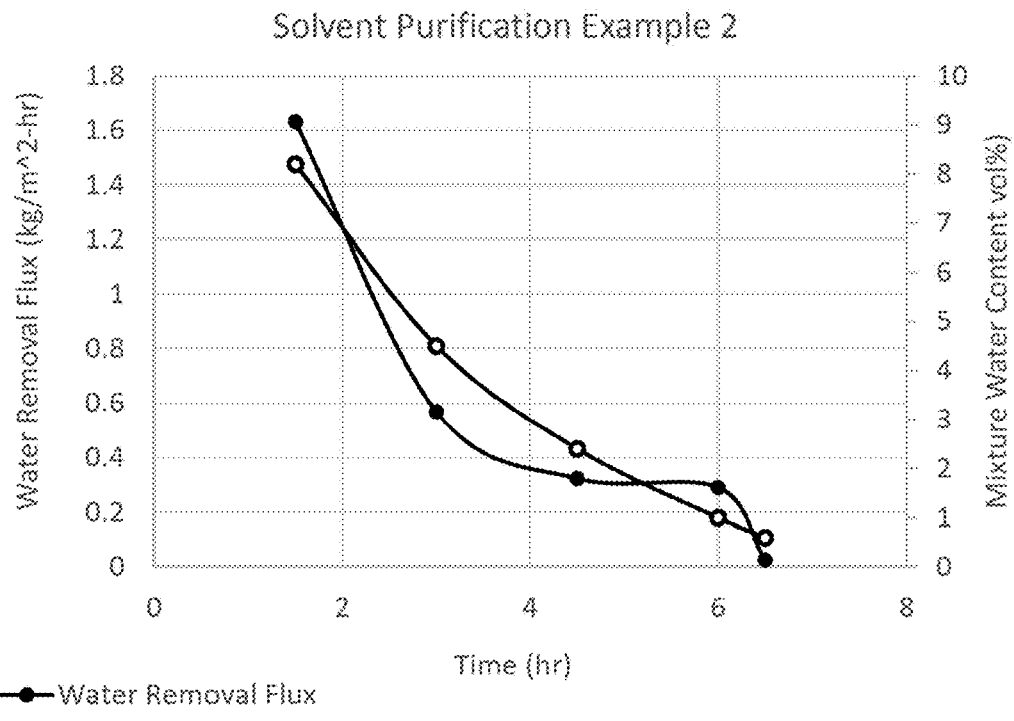

The experiment of Example 1 was repeated using only the pervaporation component of the equipment shown in FIG. 3. In this example of a mixture with 300 mL of acetonitrile with 15 vol-% water was subject to pervaporation as outlined in example 1. The feed flux to the pervaporation was 30-50 mL/min and the pressure on the retentate was held at 10 psi. The results of the pervaporation experiment are shown in FIGS. 6A and 6B. It was again observed that pervaporation was able to remove water to a low enough level for reuse.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A system for separating a solvent, the system comprising:
   a first mixing tank comprising a waste solvent feed line connected to a waste solvent source and a reactant feed line connected to a reactant source;
   a first filter comprising a nanofiltration membrane in filtration mode and configured to receive flow from the first mixing tank and to remove solids from the flow;
   a distillation column or an evaporator, configured to receive permeate from the first filter;
   a condenser or cooler configured to condense or cool flow from the distillation column or evaporator; and
   a pervaporation membrane configured to receive condensed or cooled flow from the condenser or cooler and to separate a first solvent from a second solvent by pervaporation.

2. The system of claim 1 further comprising:
   a microfilter arranged between the first mixing tank and the first filter or between the first filter and the distillation column;
   an ultrafilter arranged between the first mixing tank and the first filter or between the first filter and the distillation column; or
   both.

3. The system of claim 1, wherein the condenser or cooler is configured to receive a distillate from the distillation column.

4. The system of claim 1, wherein the nanofiltration membrane has a molecular weight cutoff between 100 Da and 1000 Da.

5. The system of claim 1, further comprising pH adjustment of contents of the first mixing tank.

6. The system of claim 1, wherein the waste solvent source comprises a chromatographic separation system.

7. The system of claim 1, further comprising one or more sensors capable of measuring acetonitrile content.

8. The system of claim 1, further comprising one or more sensors capable of measuring water content.

9. The system of claim 1, wherein the pervaporation membrane comprises an absorbent, adsorbent, or porous particles.

10. The system of claim 1, wherein the pervaporation membrane comprises zeolite.

11. The system of claim 1, wherein the pervaporation membrane is configured to be selective for water.

12. The system of claim 1, further comprising a return line from the pervaporation membrane to the distillation column.

13. The system of claim 1, wherein the distillation column or evaporator comprises a multistage evaporator.

14. The system of claim 1, wherein the distillation column or evaporator comprises a multistage distillation column.

15. The system of claim 14, wherein the distillation column is separated into multiple stages by trays or is filled with packing material.

16. The system of claim 5, wherein the pH adjustment comprises adding an inorganic base via the reactant feed line into the first mixing tank.

17. The system of claim 16, wherein the system comprises a source of sodium bicarbonate, magnesium chloride, ferric chloride, sodium hydroxide, trisaminomethane, polyethyleneimine, triethylamine, or a combination of any two or more thereof.

18. The system of claim 6, wherein the waste solvent source comprises a source of acetonitrile.

19. The system of claim 6, wherein the waste solvent source comprises a source of ethanol, methanol, isopropanol, butanol, ethyl acetate, acetone, chloroform, diethyl ether, halothane, benzene, hexafluorobenzene, or a combination of any two or more thereof.

*    *    *    *    *